United States Patent [19]
Oku

[11] Patent Number: 5,831,355
[45] Date of Patent: *Nov. 3, 1998

[54] SPINDLE MOTOR

[75] Inventor: Yoshito Oku, Toyono-gun, Japan

[73] Assignee: Nidec Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 725,977

[22] Filed: Oct. 4, 1996

[30] Foreign Application Priority Data

Oct. 6, 1995 [JP] Japan .................................. 7-286484

[51] Int. Cl.$^6$ ..................................................... H02K 15/00
[52] U.S. Cl. ........................... 310/42; 310/67 R; 310/71; 29/596
[58] Field of Search ..................................... 310/71, 67 R, 310/42; 360/99.04, 99.07, 99.08, 98.07; 29/596

[56] References Cited

U.S. PATENT DOCUMENTS

| | | | |
|---|---|---|---|
| 5,138,209 | 8/1992 | Chuta et al. | 310/67 R |
| 5,173,814 | 12/1992 | Elsasser et al. | 360/98.07 |
| 5,333,079 | 7/1994 | Takegami et al. | 360/99.08 |
| 5,391,952 | 2/1995 | Simazu et al. | 310/67 R |
| 5,414,575 | 5/1995 | Katakura | 360/99.08 |
| 5,434,729 | 7/1995 | Katakura et al. . | |
| 5,452,156 | 9/1995 | Uda et al. | 360/97.01 |
| 5,516,212 | 5/1996 | Titcomb | 384/107 |

*Primary Examiner*—Clayton E. Laballe
*Assistant Examiner*—B. Mullins
*Attorney, Agent, or Firm*—McCormick, Paulding & Huber

[57] ABSTRACT

A spindle motor comprises a stationary member having a cylindrical mounting hole therein, a tubular member fitted into the mounting hole of the stationary member, a bearing means mounted to the inner side of the tubular member, a rotor supported by the bearing means for rotation in relation to the tubular member, a stator fitted onto the outer side of the tubular member, and a rotor magnet mounted to the rotor to be located radially and outwardly of the stator. The procedure of assembling the spindle motor includes mounting the rotor magnet to the rotor, joining the rotor by the bearing means to the tubular member for rotation, fitting the stator onto the tubular member, and fitting the tubular member into the mounting hole of the stationary member.

4 Claims, 8 Drawing Sheets

SPINDLE MOTOR

FIELD OF THE INVENTION

The present invention relates to a spindle motor for rotating disk recording mediums such as harddisks or optical disks.

DESCRIPTION OF THE PRIOR ART

A known spindle motor of a shaft rotation type for driving magnetic disks is constructed as illustrated in FIG. 14. As shown, a spindle motor 202 comprises a substantially circular bracket 204 to be mounted to a disk drive device, and a rotor 206 rotatable relative to the bracket 204. The bracket 204 is provided with a bearing support 208 at the cental portion thereof. A stator 210 is fitted onto the outer side of the bearing support 208. The rotor 206 has a cup-like hub 212 on which a magnetic disk is mounted and a shaft 214 depending from the center of the hub 212. The shaft 214 is rotatably mounted by a pair of ball bearings 216 and 218 to the inner side of the bearing support 208. An annular rotor magnet 220 is fixedly mounted on the inner side of a circumferential wall of the hub 212 in such a way that it is located opposite to and spaced by a small gap from the outer periphery of the stator 210. The bracket 204 is formed with through holes 222 at the positions opposite to the stator 210. A tubular lead bushing 224 made of an insulating material is accommodated in each of the through holes 222. Each lead wire 226 of the coils of the stator 210 is threaded through the lead bushing 224, led beneath the bracket 204, and welded by soldering to a given location on a flexible printed circuit board 228 which is bonded to the lower side of the bracket 204. A spacer 230 is interposed between the outer races of the two ball bearings 216 and 218.

The known spindle motor 202 is assembled by the following procedure. First, the lead bushings 224 are inserted into the through holes 222 of the bracket 204 and the flexible printed circuit board 228 is bonded to the lower side of the bracket 204, as shown in FIG. 15. The stator 210 is then lowered from above to fit onto the bearing support 208 of the bracket 204 and its coil leads 226 are threaded through the lead bushings 224 and soldered to the flexible printed circuit board 228. Also, the rotor magnet 220 is fixedly mounted to the inner side of the outer wall of the hub 212 of the rotor 206. The inner race of the upper bearing 216 is fitted onto a proximal end of the shaft 214 of the rotor 206. This is followed by insertion of the shaft 214 of the rotor 206 together with the upper bearing 216 into the bearing support 208 of the bracket 204, as shown in FIG. 15, until the outer side of the outer race of the upper bearing 216 is directly joined to the uppermost of the inner side of the bearing support 208. The spacer 230 and the lower bearing 218 are lifted from below to fit into the bearing support 208. While the inner race of the lower bearing 218 is urged upwardly by a pressure, the lower bearing 218 is secured with its inner race to the end portion of the outer side of the shaft 214 and with its outer race to the lowermost portion of the inner side of the bearing support 218.

However, the above described structure of the spindle motor 202 has drawback in that it is susceptible to misalignment of parts in its assembly.

As seen from FIG. 15, when the rotor 206 is being mounted to the bracket 204, magnetic attractive force arises between the rotor magnet 220 and the stator 210 and may cause the rotor 206 to tilt resulting in abutment of the rotor magnet 220 against the stator 210. If the rotor 206 tilts relative to the bracket 204, the rotor vibrates during its rotation and does not rotate smoothly. Also, the space between the rotor magnet 220 and the stator 210 will vary causing the bearings to receive uneven stresses and unstable rotation.

In addition, it is troublesome to thread the coil leads 226 of the stator 210 through the hole of the lead bushings 224. The smaller the size of the spindle motor, the more time the job takes.

SUMMARY OF THE INVENTION

It is a primary object of the present invention to provide a motor structure which can be assembled smoothly and accurately.

It is another object of the present invention to provide a spindle motor which is free from mis-alignment due to tilting of a rotor relative to a stator during their assembly.

It is a further object of the present invention to provide a spindle motor which can be assembled without being affected by the magnetic force caused between a rotor magnet and a stator coil.

It is a still further object of the present invention to provide a motor with which a lead wire derived from the coil of a stator can be easily threaded through a stationary bracket during assembly of the motor.

Other objects and features of the present invention will be understood from the following description.

DETAILED DESCRIPTION OF THE PREFERRED EMBODIMENTS

The present invention will now be described in more detail referring to the accompanying drawings.

First, explanation will be made about a spindle motor according to the first embodiment of the present invention with reference to FIGS. 1 to 11.

Figure 1:
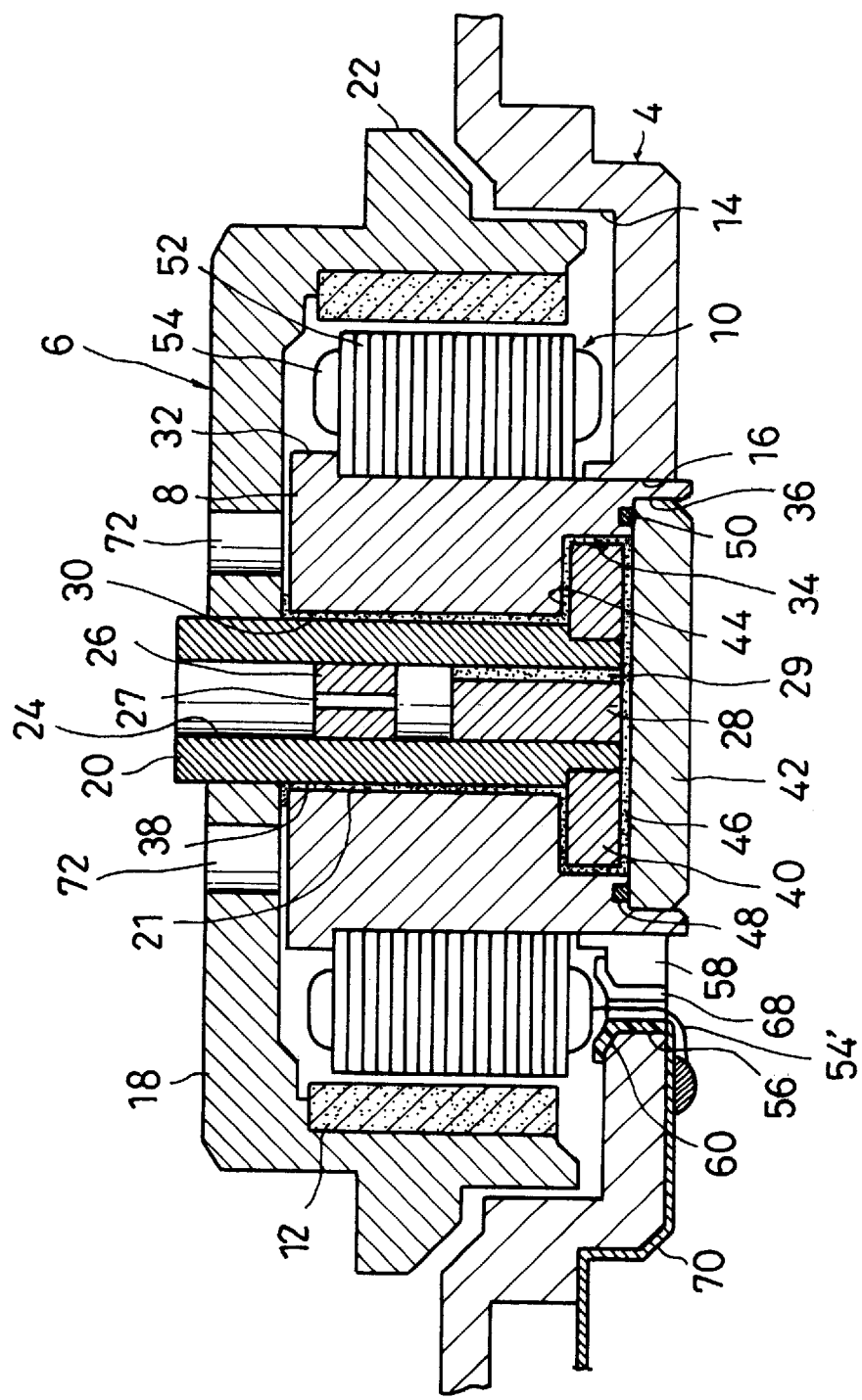
FIG. 1 is a schematic cross sectional view of the entire construction of a spindle motor according to a first embodiment of the present invention.
Figure 2:
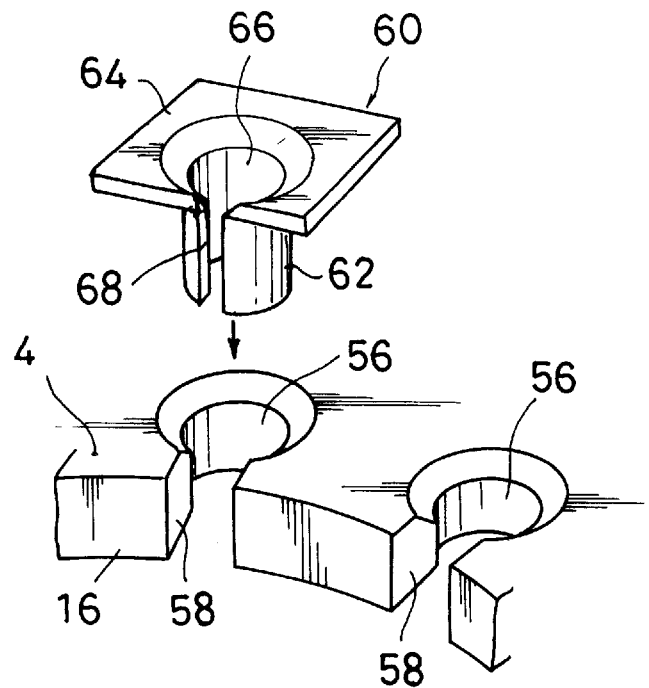
FIG. 2 is a partially exploded perspective view of a lead bushing and a corresponding bushing hole provided on a bracket of the spindle motor shown in FIG. 1.
Figure 3:
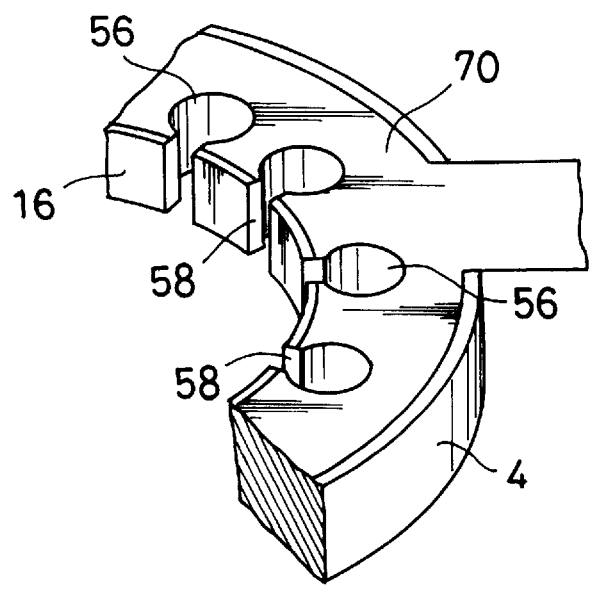
FIG. 3 is a perspective view of a part of the bracket of the spindle motor shown in FIG. 1.

The spindle motor of the first embodiment is of a shaft rotation type having dynamic pressure bearing means. As shown in FIG. 1, a spindle motor 2 comprises a bracket 4 which is to be mounted on a disk drive device (not shown). A rotor 6 is arranged for rotation relative to the bracket 4. A tubular sleeve 8 fixedly mounted on the bracket 4 serves as a part of the dynamic pressure bearing means for supporting the rotor 6. A stator 10 is fixedly mounted on the sleeve 8, and an annular rotor magnet 12 is integrally coupled to the rotor 6.

The bracket 4 is substantially of a disk shape having a circular recess 14 which is concentric with the motor axis. A mounting hole 16 is provided in the center of the bracket 4 coaxially with the recess 14. The sleeve 8 is securely fitted at its lower end to the mounting hole 16 so that it stands upright on the bracket 4.

The rotor 6 comprises a rotor hub 18 made of a magnetic material such as stainless steel and a tubular shaft 20 fixed coaxially to the rotor hub 18 and made of e.g. stainless steel. The rotor hub 18 has an inverted cup-like shape opening downwardly with the shaft 20 projecting downwardly in the opening. The rotor magnet 12 is bonded by adhesive to the inner side of a circumferential wall of the rotor hub 18. The outer side of the circumferential wall of the rotor hub 18 is shaped to hold a magnetic disk (not shown). More specifically, the magnetic disk is held on a flange 22 provided on the circumferential wall of the rotor hub 18. The outer side of the tubular shaft 20 is finished precisely to have a smooth bearing surface 21. The shaft 20 has a central bore 24 therein into which a first shaft sleeve 26 (best shown in FIG. 5) and a second shaft sleeve 28 (best shown in FIG. 6) are tightly fitted. The first sleeve 26 is located at the middle portion of the shaft 20 and has a through hole 27 axially formed in the center thereof for atmospheric communication. The second shaft sleeve 28 is located at the lower portion of the shaft 20 and has a plurality (three in this embodiment) of axially extending, angularly equally spaced slits 29 on the outer surface thereof.

The sleeve 8 comprises a tubular member made of a copper alloy and having an inner surface which is finished precisely to provide a smooth bearing surface 30. The outer side of the sleeve 8 has a flange-like projection 32 provided on the uppermost thereof. The sleeve 8 is formed with a thrust recess 34 in a lower region of the inner side thereof. The thrust recess 34 has a greater diameter than the inner bearing surface 30. The sleeve 8 is formed with a cover receiving recess 36 provided below the thrust recess 34 at the lower end of the inner side of the sleeve 8. The cover receiving recess 36 has a greater inner diameter than the thrust recess 34. A predetermined small gap 38 is formed between the inner bearing surface 30 of the sleeve 8 and the outer bearing surface 21 of the shaft 20. The gap 38 is filled with an appropriate fluid lubricant. A herringbone groove (not shown) for producing a dynamic pressure is provided on either the inner bearing surface 30 of the sleeve 8 and/or the outer bearing surface 21 of the shaft 20. This permits the shaft 20 to be radially within the sleeve 8 by means of the dynamic pressure in the sleeve 8.

An annular thrust plate 40 is fixed to the lower end of the shaft 20 and accommodated in the thrust recess 34 of the sleeve 8. A disk-like thrust cover 42 is fitted to the cover accepting recess 36 of the sleeve 8 thus closing the inner hollow of the tubular sleeve 8 at its lower end. A small gap 44 is formed between the upper side of the thrust plate 40 and a lower surface of the sleeve 8 exposed to the thrust recess 34. Also, a small gap 46 is formed between the lower side of the thrust plate 40 and the upper side of the thrust cover 42. Both the gaps 44 and 46 are filled with the fluid lubricant. A herringbone or spiral groove for producing a dynamic pressure is formed on both or either of the two opposite surfaces that define the small gap 44 or 46. This allows the shaft 20 to be supported by the fluid lubricant with pressure being caused therein by the rotation of the thrust plate relative to the sleeve 8 with the thrust plate being restrained at a given axial position. In addition, an annular groove 48 is formed on a lower surface of the sleeve 8 exposed to the cover accepting recess 36. An O-ring 50 is fitted into the annular recess 48 for airtight sealing of the interface between the sleeve 8 and the thrust cover 42.

Figure 6:
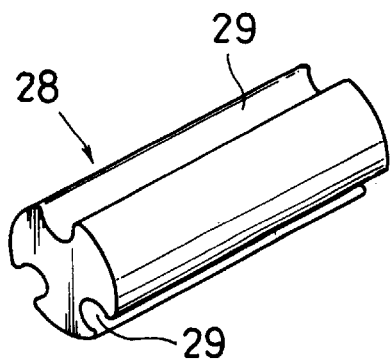
FIG. 6 is a perspective view of another type of shaft sleeve to be used in the spindle motor shown in FIG. 1.

As the second shaft sleeve 28 is located at the lower end position of the center bore 24 of the shaft 20, its slits 29 also axially communicate the center bore 24 of the shaft 20 with the gap 44. The slits 29 of the second sleeve 28 are capable of holding an excess of the fluid lubricant raised by capillary action from the small gap 44 and thus act as a fluid lubricant reservoir. If required, excess fluid lubricant stored in the slits 29 is fed to the dynamic pressure bearing means. As the through hole 27 of the first shaft sleeve 26 communicates the interior of the shaft 20 to the outside or atmosphere, the fluid lubricant is fed from the slits 29 to the dynamic pressure bearing means smoothly. Instead of forming the through hole 27 in the first shaft sleeve 26, a communicating aperture may be formed in a screw or retaining member (not shown) which is provided for fastening the upper end of the shaft 20. The aperture may not necessarily be in the form of central hole but may be a slit or notch formed on the periphery of the screw or other retaining member. Neither are the slits 29 of the second shaft sleeve 28 limited to the configurations shown but may take any form so far as they function as axially communicating channels. The slits 29 of the second shaft sleeve 28 of FIG. 6 are preferably arranged symmetrically about the axis of rotation for balancing the rotating movement of the shaft.

Figure 4:
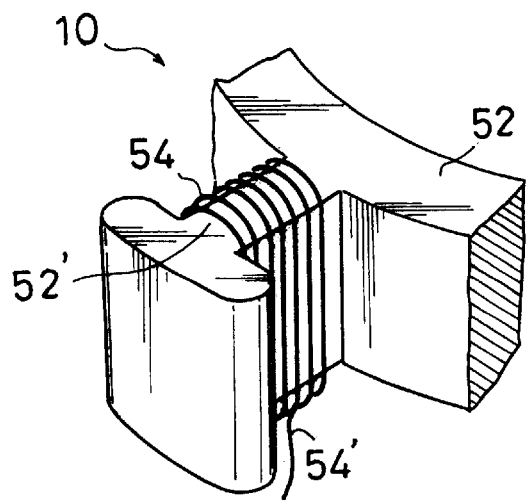
FIG. 4 is a partial perspective view of a part of a stator of the spindle motor shown in FIG. 1.
Figure 5:
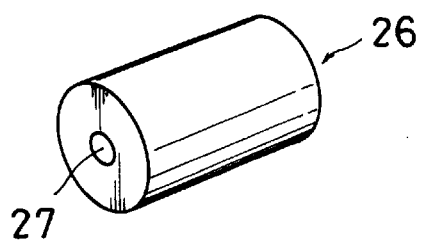
FIG. 5 is a perspective view of a shaft sleeve of the spindle motor shown in FIG. 1.

The stator 10 comprises, as shown in FIG. 4, a core 52 fixedly fitted on the outer side of the sleeve 8 and coils 54 wound on teeth 52' of the core 52. A coil lead 54' is derived from each of the coils 54. The stator 10 is radially spaced by a small gap from and arranged opposite to the rotor magnet 12.

The bracket 4 is formed with a group of coil lead passing slots 56 arranged at equal angular intervals adjacent to the mounting hole 16. Each of the coil lead passing slots 56 communicates via a slit 58 with the mounting hole 16. A lead bush 60 which is made of an insulating material is fitted from above into the coil lead passing slot 56. The lead bush 60 comprises a tubular portion 62 fitted into the coil lead passing slot 56 and a flange-like retaining portion 64, FIG. 2, formed integrally with the tubular member 62 at the top thereof. The tubular portion 62 allows the coil lead 54' to pass through a center opening 66. The center opening 66 communicates with an axially extending opening 68 formed on the periphery of the tubular portion 62. The lead bush 60 is installed such that its opening 68 aligns with the corresponding slit 58 of the bracket 4. Also, a flexible printed circuit board 70 is bonded to the lower side of the bracket 4. The coil leads 54' are threaded through their corresponding lead bushes 60 and are connected by soldering to corresponding terminals on the flexible printed circuit board 70.

Figure 7:
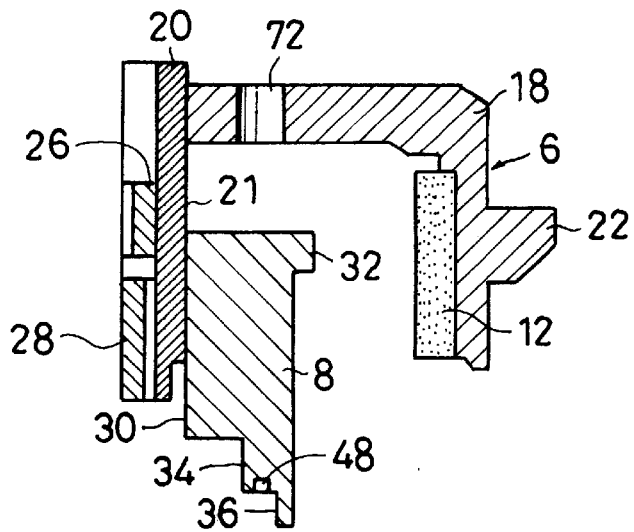
FIG. 7 is a partial cross sectional view showing a step for coupling a sleeve to a rotor in the spindle motor shown in FIG. 1.

A procedure for assembling the spindle motor 2 of the first embodiment will now be explained referring to FIGS. 7 to 11. The procedure starts with inserting the first shaft sleeve 26 and the second shaft sleeve 28 into the center hollow 24 of the tubular shaft 20 and joining the shaft 20 to the rotary hub 18 as shown in FIG. 7. The rotor magnet 12 is then fixedly mounted to the inner side of the circumferential wall of the rotor hub 18 in order to complete the rotor 6. The shaft 20 of the rotor 6 is fitted into the sleeve 8.

Figure 8:
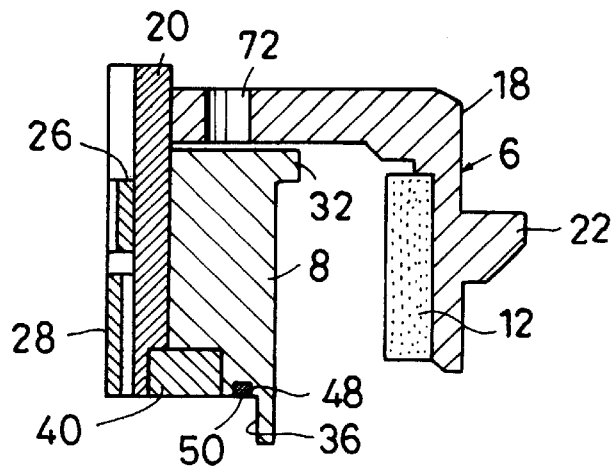
FIG. 8 is a partial cross sectional view showing a step for installing a thrust plate in the spindle motor shown in FIG. 1.
Figure 9:
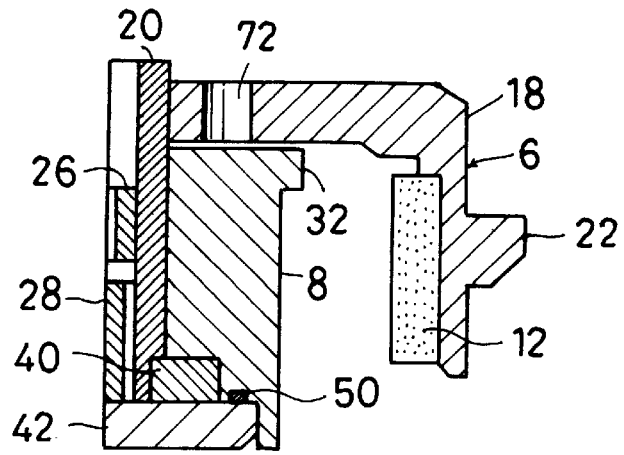
FIG. 9 is a partial cross sectional view showing a step for installing a thrust cover in the spindle motor shown in FIG. 1.
Figure 10:
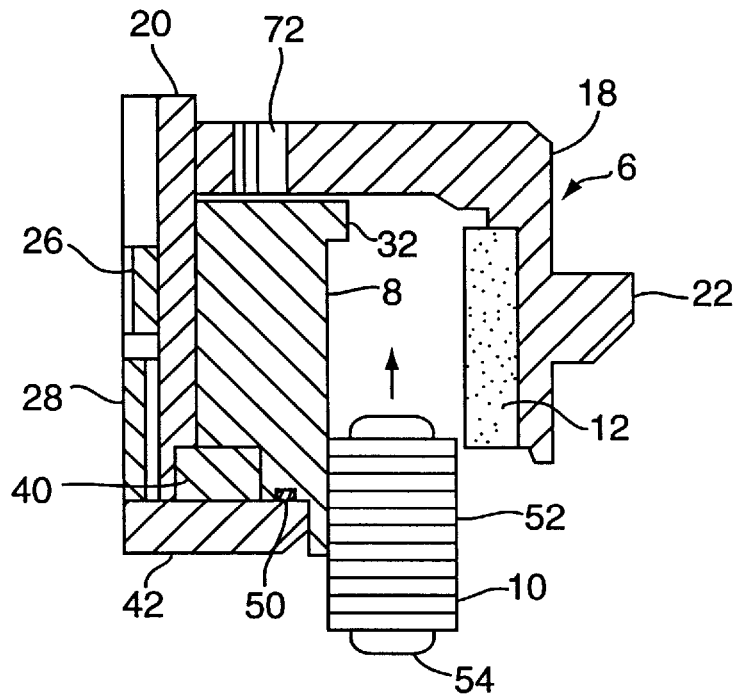
FIG. 10 is a partial cross sectional view showing a step for installing the stator in the spindle motor of FIG. 1.

Then, the thrust plate 40 is fixed to the lower end of the shaft 20 to restrain the sleeve 8, as shown in FIG. 8. At that time, the thrust plate 40 is seated in the thrust recess 34 of the sleeve 8. The O-ring 50 is also fitted into the annular groove 48 of the sleeve 8. This is followed by inserting the thrust cover 42 to a predetermined location in the cover accepting recess 36 of the sleeve 8 and securing it as shown in FIG. 9. Meanwhile, the small gaps 38, 44, and 46 are filled with the fluid lubricant prior to the installation of the thrust cover 42. This allows the rotor hub 18 to be rotatably supported by the dynamic pressure bearing means. The stator 10 with the coils 54 wound on its core 52 is then fitted onto the sleeve 8, as shown FIG. 10. When the upper side of the stator 10 has come into direct contact with the lower side of the flange-like projection 32 of the sleeve 8, the stator 10 is axially located in a correct position. Accordingly, the rotor magnet 12 on the rotor hub 18 is prevented from adverse engagement with the stator 10 during the installation regardless of magnetic interference between the rotor magnet 12 and the stator 10 and will provide no deflection of the rotor hub 18. As the shaft 20 of the rotor 6 is correctly fitted into the sleeve 8, the distance between the rotor magnet 12 and the stator 10 remains unchanged and uniform.

Figure 11B:
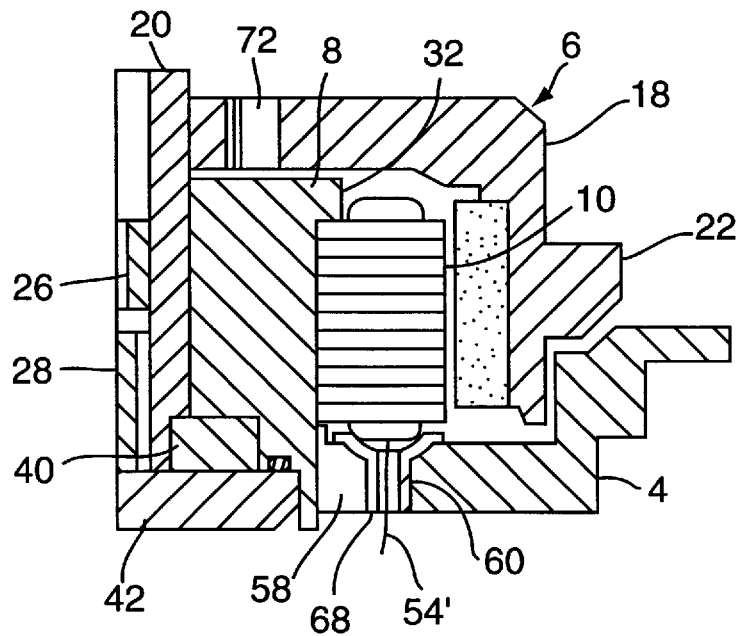
FIG. 11a is a partial cross sectional view showing a step for fixing the sleeve in the spindle motor of FIG. 1.
FIG. 11 is a partial cross sectional view showing a step for installing the bracket in the spindle motor of FIG. 1.
Figure 11A:
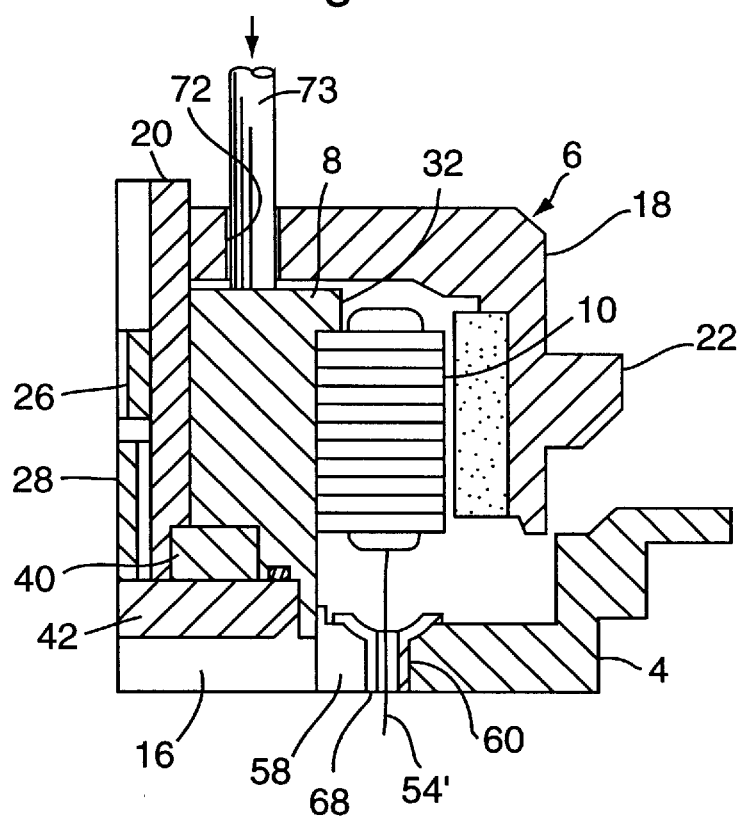

Meanwhile, the lead bushes 60 are fitted into their corresponding coil lead passing slots 56 of the bracket 4 and the flexible printed circuit board 70 is bonded to the lower side of the bracket 4. Then, the lower end of the sleeve 8 carrying the rotor 6 is fitted into the mounting hole 16 of the bracket 4, as shown in FIG. 11. The fitting is carried out by pressing the sleeve 8 but not the rotor 6 toward the mounting hole 16. More particularly, as shown in FIG. 11a, a bar-like tool 73 is inserted through a work aperture or access hole 72 provided in the rotor hub 18 opposite the sleeve 8 so that the sleeve 8 is forced downwardly and fitted into mounting hole 16. During the fitting of the sleeve 8 into the mounting hole 16, the coil leads 54' extending from the stator 10 across the mounting hole 16 which is communicated with the lead passing slots 56 of the bracket 4 and the lead bushes 60 installed in the slots 56. The coil leads are shifted from the mounting hole 16 through the slits 58 and the axial openings 68 into the center hollows 66 of the corresponding lead bushes 60. As the coil leads 54' pass through the center hollows 66 of the corresponding lead bushings 60, they are easily drawn out from the bracket 4. The coil leads 54' are finally connected by soldering to the flexible printed circuit board 70.

The spindle motor 2 of the first embodiment has the following significant advantages.

When the stator 10 is mounted to the sleeve 8 which serves as a stationary member, the stator 10 is inserted axially and inwardly or upwardly from the lower opening of the rotor hub 18 with the stator being moved along the outer side of the sleeve 8, and secured in position upon coming into contact with the flange-like projection 32. Thus, the stator 10 is affected as little as possible by the magnetic interference between the rotor hub 18 and the rotor magnet 12 while the stator 10 is being installed and anchored to the sleeve 8, thereby insuring precise assembly. The stator 10 is to be mounted on the sleeve 8 which has been coupled with the rotor 6 in advance to support it. The rotor 6 is hence free from the magnetic interference for highly accurate rotation since the rotor 6 has been supported precisely even if the stator 10 is affected by the magnetic interference of the rotor hub 18 and the rotor magnet 12. The coil leads 54' of the stator 10 are easily drawn out because the lead passing slots 56 of the bracket 4 and the lead bushings 60 installed in the slots 56 are communicated through the slits 58 and the axial openings 68 to the mounting hole 16. This will increase the quality and efficiency of assembly work. Particularly, this embodiment employs the dynamic bearing means provided with the storage of the fluid lubricant and will provide highly accurate, life-long bearing functions.

Figure 12:
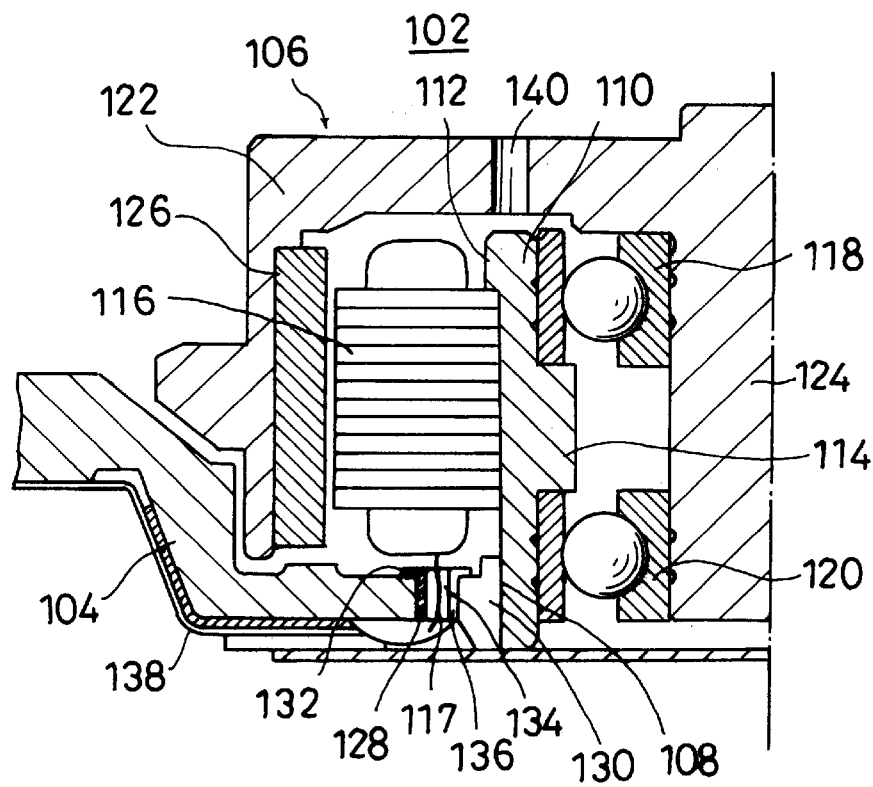
FIG. 12 is a partial cross sectional view of a spindle motor according to a second embodiment of the present invention.

A spindle motor according to a second embodiment of the present invention now be described referring to FIG. 12.

The second embodiment is the spindle motor 102 of the shaft rotation type using ball bearings as the bearing means. The spindle motor 102 includes a substantially circular bracket 104 mounted to a disk drive and a rotor 106 arranged for rotation in relation to the bracket 104. The bracket 104 has a round mounting hole 108 provided in the center thereof and a separate upstanding tubular bearing support 110 is fitted at its lower end into the mounting hole 108. The bearing support 110 has a flange-like projection 112 provided on the upper end of the outer side thereof and an inwardly projecting land 114 provided on a center of the inner side thereof. A stator 116 is fitted onto the outer side of the bearing support 110 as positioned with the flange-like projection 112. A pair of ball bearings 118 and 120 are fitted to the inner side of the bearing support 110 at upper and lower ends respectively and are positioned by the land 114.

The rotor 106 comprises a cup-like rotor hub 122 on which a magnetic disk is mounted and a shaft 124 extending upwardly the center of the rotor hub 122. The shaft 124 is rotatably joined by the ball bearings 118 and 120 to the inner side of the bearing support 110. An annular rotor magnet 126 is fixedly mounted to the inner side of a circumferential wall of the rotor hub 122. The rotor magnet 126 is spaced by a small gap from and located opposite to the outer side of the stator 116.

A group of lead passing slots 128 corresponding to coil leads 117 from the stator 116 are provided in the bracket 104 at equal intervals about and adjacent to the mounting hole 108. Each of the lead passing slots 128 communicates through an axially extending slit 130 with the mounting hole 108. A lead bushing 132 made of an insulating material is fitted into the lead passing slot 128. The lead bushing 132 comprises a tubular body inserted into the lead passing slot 128 and a flange provided at the upper end of the tubular body. A center opening 134 is provide across the tubular body. The lead bushing 132 has an axially extending opening 136 provided in the tubular body thereof. The center opening 134 is hence communicated through the opening 136 and the slit 130 to the mounting hole 108 of the bracket 104. A flexible printed circuit board 138 is bonded to the lower side of the bracket 104.

A procedure of assembling the spindle motor 102 of the second embodiment will now be explained.

The procedure starts with mounting the rotor magnet 126 to the rotor hub 122, fitting the inner race of the upper ball bearing 118 onto the upper end of the shaft 124, and inserting the shaft 124 from above into the bearing support 110 to join the outer race of the upper bearing 118 directly to the bearing support 110. The lower bearing 120 is inserted from below into the bearing support 110 so that its outer race is directly joined to the bearing support 110 and its inner race to the lower end of the shaft 124. The two ball bearings 118 and 120 are then bonded by means of adhesives under pressure. Accordingly, the rotor 106 is rotatably linked by the two ball bearings 118 and 120 to the bearing support 110.

This is followed by fitting the stator 116 onto the outer side of the bearing support 110. As the stator 116 is inserted along the outer side of the bearing support 110 into the rotor 106 which remains rotatably supported with the bearing support 110 without any deflection, it is prevented from directly engaging with the rotor magnet 126. This minimizes the magnetic interference between the stator 116 and the rotor magnet 126. The stator 116 is positioned when it comes into contact with the flange-like projection or shoulder 112 of the bearing support 110.

Meanwhile, the lead bushings 132 are fitted into their respective lead passing slots 128 of the bracket 104 and the flexible printed circuit board 138 is bonded to the lower side of the bracket 104. Then, the lower end of the bearing support 110 carrying the rotor 106 is fitted under pressure into the mounting hole 108 of the bracket 104. The pressure fitting of the bearing support 110 into the mounting hole 108 is carried out by inserting a bar-like tool into a work hole 140 provided in the upper side of the rotor hub 122 and pressing it against the bearing support 110. Before the fitting of the bearing support 110 into the mounting hole 108, the coil leads 117 extending from the stator 116 across the mounting hole 108 are shifted from the mounting hole 108 through the slits 130 and the axial openings 136 into the center openings 134 of the corresponding lead bushings 132 for drawing out. When the bearing support 110 has been fitted into the mounting hole 108, the coil leads 117 are connected by soldering to the flexible printed circuit board 138.

In the spindle motor 102 of the second embodiment similar to the first embodiment, the stator 116 and the rotor 106 are coupled to each other without direct engagement between the stator 116 and the rotor magnet 126 hence increasing the quality and efficiency of assembly operation. Also, the coil leads 117 of the stator 116 can easily be drawn out thus facilitating the assembly operation.

Figure 13:
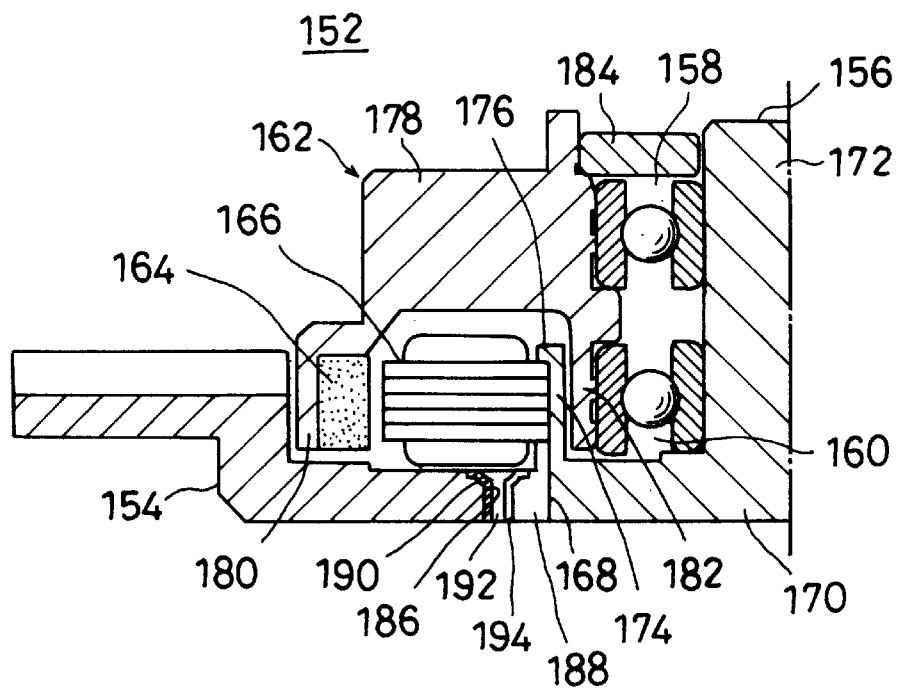
FIG. 13 is a partial cross sectional view of a spindle motor according to a third embodiment of the present invention.
Figure 14:
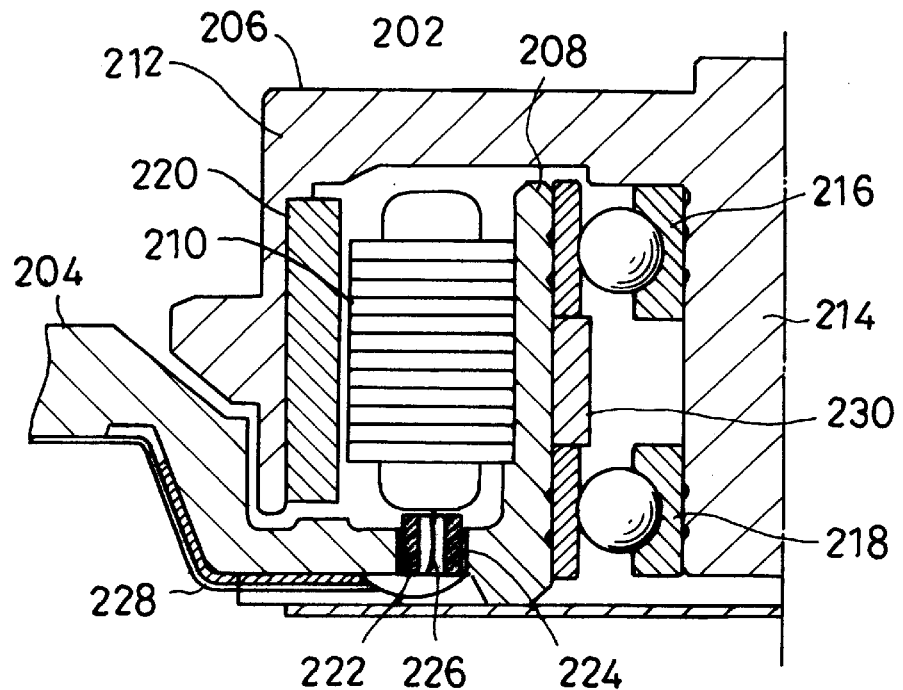
FIG. 14 is a partial cross sectional view of a conventional spindle motor.
Figure 15:
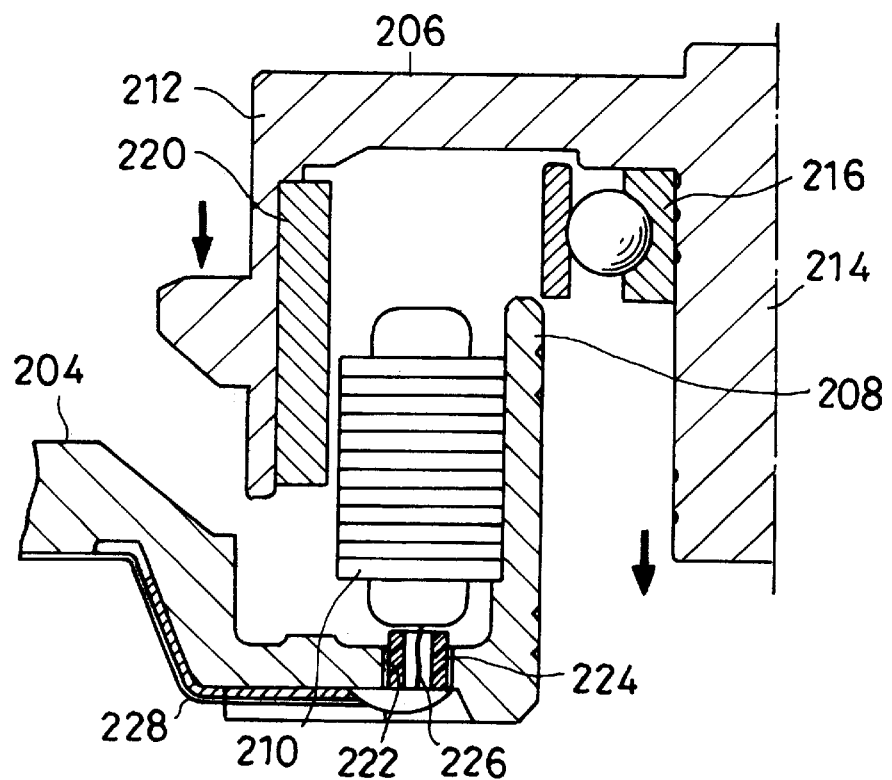
FIG. 15 is a partial cross sectional view showing a step for assembling the spindle motor of FIG. 14.

A spindle motor according to a third embodiment of the present invention will be described referring to FIG. 13.

The spindle motor 152 of the third embodiment is of the stationary shaft type using ball bearing means. The spindle motor 152 includes a substantially circular bracket 154 mounted to a disk drive, a stationary central shaft 156 provided integrally with the bracket 154 a rotor 162 rotatably supported via a pair of ball bearings 158 and 160 by the shaft 156, an annular rotor magnet 164 mounted to the rotor 162, and a stator 166 provided integrally with the bracket 154. The outer side of the stator 166 is spaced by a small gap from and located opposite to the inner side of the rotor magnet 164.

The bracket 104 has a round mounting hole 168 provided in the center thereof. The shaft 156 comprises a disk-shaped bottom plate 170, a capstan 172 vertically extending from the center of the bottom plate 170, and a cylinder 174 extending upwardly from the outer edge of the bottom plate 170. The bottom plate 170 is fitted into the mounting hole 168 of the bracket 154. A flange-like projection 176 is provided on the upper end of the cylinder 174.

The rotor 162 includes a rotor hub 178 made of a magnetic material such as stainless steel and an outer cylinder 180 extending downwardly from the outer edge of the rotor hub 178. A rotor magnet 164 is bonded by adhesive to the inner side of the outer cylinder 180. The upper ball bearing 158 is mounted to the inner side of the rotor hub 178 and the lower ball bearing 160 to the inner side of an inner cylinder 182 extending downwardly from the inner edge of the rotor hub 178. An annular labyrinth cap 184 is fitted into the upper end of the inner side of the rotor hub 178. The inner side of the labyrinth cap 184 is spaced by a small gap from and located opposite to the upper end of the outer side of the stationary shaft 172 hence forming a labyrinth sealing structure. The labyrinth cap 184 is located above the upper ball bearing 158 or at the motor outward side for preventing unwanted dirt e.g. grease from escaping from the ball bearings 158 and 160 to the outside of the motor 152. The inner cylinder 182 of the rotor hub 178 is radially spaced by a small gap from and arranged opposite to the cylinder 174 of the shaft 156, forming another labyrinth sealing structure.

A group of lead passing slots 186 are provided in the bracket 154 about and adjacent to the mounting hole 168. Each of the lead passing slots 186 is communicated through a slit 188 to the mounting hole 168. A lead bushing 190 made of an insulating material is fitted into the lead passing slot 186. The lead bushing 190 has an axially extending center hollow 192 provided therein and an axially extending opening 194 thereof so that the center hollow 192 communicates with the slit 188.

A procedure of assembling the spindle motor 152 of the third embodiment will now be explained.

The procedure starts with mounting the rotor magnet 164 to the rotor hub 178 and rotatably joining the shaft 156 by the two ball bearings 158 and 160 to the stationary shaft 172.

Then, the stator 166 is inserted from the open side of the rotor hub 178 and fitted onto the outer side of the cylinder 174 of the shaft 156 carrying the rotor 162. As the stator 166 is inserted along the outer side of the shaft 156 into the rotor 162 which remains supported securely with the shaft 156 with no deflection, it is prevented from direct engagement with the rotor magnet 164. This minimizes the magnetic interference between the stator 166 and the rotor magnet 166. The stator 166 is positioned when it comes into direct contact with the flange-like projection 176 of the cylinder 174.

Meanwhile, the lead bushings 190 are fitted into their respective lead passing slots 186 of the bracket 154. The lower end or the outer side of the bottom plate 170 of the shaft 156 carrying the rotor 162 is fitted under pressure into the mounting hole 168 of the bracket 154. The pressure fitting of the shaft 156 into the mounting hole 168 is conducted by directly pressing the upper side of the stationary shaft 172. Before fitting the shaft 156 into the mounting hole 168, coil leads extending from the stator 166 are shifted from the mounting hole 168 through the slits 188 and the openings 194 into the center openings 192 of the lead bushings 190 for drawing out.

In the spindle motor 152 of the third embodiment similar to the first or second embodiment, the stator 166 and the rotor 162 are coupled to each other without direct engagement between the stator 166 and the rotor magnet 164 hence increasing the quality and efficiency of the assembly operation. Also, the coil leads of the stator 166 can easily be drawn out thus facilitating the assembly operation.

It is understood that the present invention is not limited to the spindle motors of the foregoing embodiments but other changes and modifications are possible without departing the scope of the present invention. For example, the present invention is applicable with equal success to a base-mounted type spindle motor in which a rotor is supportedly joined by bearing means to the base plate of a magnetic disk drive, as compared with the prescribed spindle motor of which bracket is mounted as the stationary member to the base plate of a magnetic disk drive.

I claim:

1. An improved method for manufacturing a spindle motor comprising;

a rotational shaft;

a cylindrical sleeve surrounding the shaft and having an annular flange formed on a top portion of an outer peripheral surface of the cylindrical sleeve;

a cup-shaped rotor hub fixed on one end of the rotational shaft and having a plurality of access holes formed on portions axially opposing the cylindrical sleeve so as to expose parts of a top portion of the cylindrical sleeve;

a bearing means interposed between the rotational shaft and the cylindrical sleeve so as to rotate relationally with each other;

a stator having a plurality of coils wound around a core and secured on the outer peripheral surface of the cylindrical sleeve; and a base member having a circular mounting hole formed coaxially with the rotational shaft at a central portion and having a diameter equal to the outer diameter of the cylindrical sleeve, the base member further including a plurality of coil lead passing holes formed in the vicinity of the circular mounting hole and communicating respectively with the circular mounting hole;

said improved manufacturing method comprising the steps of fixing the rotor hub on one end of the rotational shaft, fitting the rotational shaft into the inner opening of the cylindrical sleeve, fitting the stator to the cylindrical sleeve and securing the stator thereon at a position where the stator is in contact axially with the lower surface of the annular flange, fixedly fitting a lower end portion of the outer peripheral surface of the sleeve into the circular mounting hole by pushing the top portion of the sleeve downwardly through the access holes and moving the leads of the coils into the coil lead passing holes from the mounting hole.

2. A method according to claim 1, wherein a plurality of lead bushes are fitted respectively into corresponding coil lead passing holes of the base member, and a flexible printed circuit board is secured onto the lower side of the base member, the coil leads which are led through the coil lead passing holes are electrically connected to the flexible printed circuit board.

3. A method according to claim 1, wherein a pair of ball bearings is interposed between the rotational shaft and the cylindrical sleeve for rotatably supporting the rotational shaft.

4. A method according to claim 1, wherein a disk-like thrust plate is fixed on one end of the rotational shaft and a disk-like thrust bush is fixed in the inner side of the cylindrical sleeve so as to axially oppose the thrust plate, at least one of the opposing surfaces of the rotational shaft and cylindrical sleeve, and at least one of the opposing surfaces of the thrust plate and the thrust bush are respectively formed with a plurality of grooves and lubricating fluid is filled in gaps formed therebetween so as to generate hydrodynamic pressure during rotation for supporting the rotational shaft.

* * * * *